March 9, 1926.  
H. A. BRITTAIN  
PNEUMATIC TIRE  
Filed August 5, 1921
1,575,966
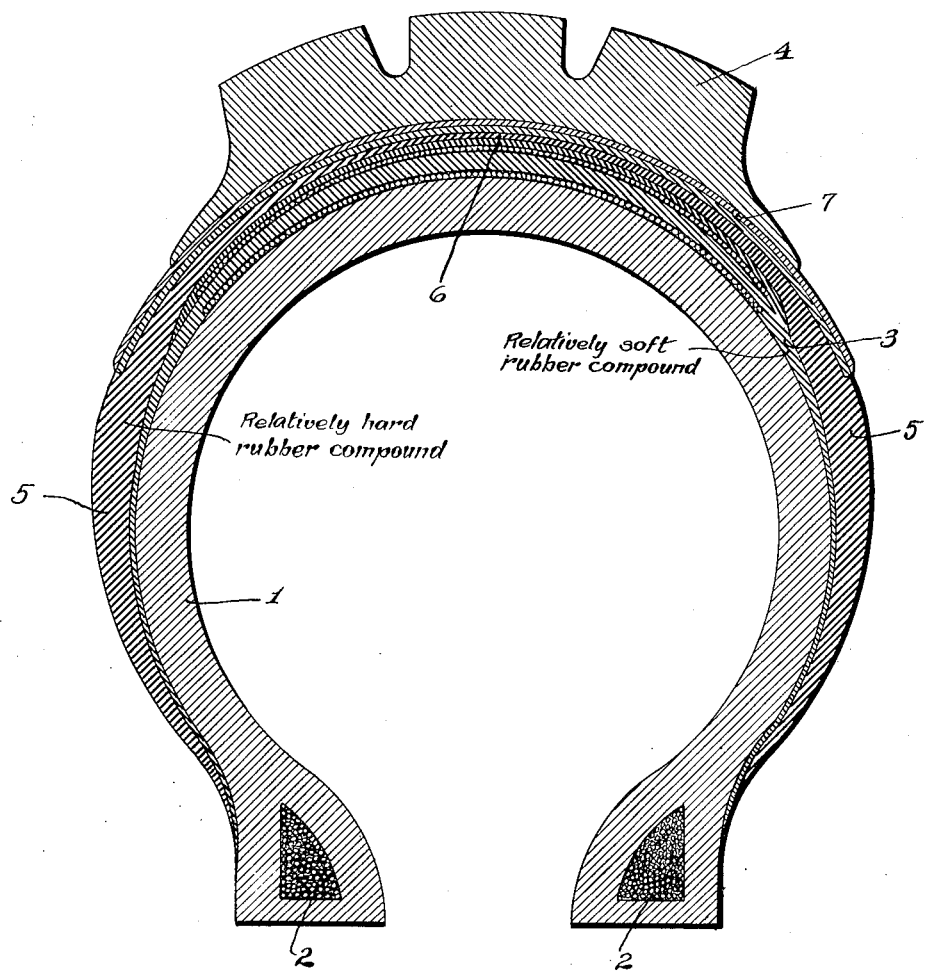
Inventor  
Harold A. Brittain Patented Mar. 9, 1926.

1,575,966

UNITED STATES PATENT OFFICE.

HAROLD A. BRITTAIN, OF AKRON, OHIO, ASSIGNOR TO THE GOODYEAR TIRE & RUBBER COMPANY, OF AKRON, OHIO, A CORPORATION OF OHIO.

PNEUMATIC TIRE.

Application filed August 5, 1921. Serial No. 490,056.

*To all whom it may concern:*

Be it known that I, HAROLD A. BRITTAIN, a subject of the King of Great Britain, residing at Akron, in the county of Summit and State of Ohio, U. S. A., have invented new and useful Improvements in Pneumatic Tires, of which the following is a specification.

My invention relates to pneumatic tires and it has, for its primary object, the construction of a tire which shall be particularly effective against excessive side wall wear.

It has been found, particularly in commercial transportation wherein heavy pneumatic tires are utilized, that the tires are subjected to excessive side wall wear in certain regions of the country where unimproved roads are encountered which become deeply rutted at certain periods of the year. The walls of such grooves or ruts formed in the roads, become hard either from being baked or frozen and, in some instances, heavy twelve ply truck tires are worn through the side wall and the layers of cord fabric penetrated to such an extent as to cause premature blowouts and consequent ruin of the tire within a week's running period.

My invention, therefore, is particularly concerned with providing a tire which shall be so constructed as to effectively resist the unusually severe conditions above described.

The particular objects and advantages of my invention will be readily apparent from the following detailed description of the accompanying drawing, the single figure of which represents a transverse sectional view of a pneumatic tire constructed in accordance with my invention.

In practicing my invention, I construct a pneumatic tire by forming a fabric carcass in the usual or conventional manner by superimposing a plurality of layers of treated fabric upon which the usual or ordinary tread member is vulcanized. The ordinary course of construction is departed from, however, in providing the side wall coverings for the tire in that a particularly tough and relatively hard rubber compound is utilized, which is of much greater thickness than the side wall coverings which have been utilized heretofore. The nature of the side wall coverings makes necessary the provision of an intermediate layer of cushion stock or relatively soft rubber to secure a satisfactory union between the side wall coverings and the fabric carcass of the tire.

In order to insure a clear and accurate understanding of my invention, a tire is shown in the accompanying drawing comprising a fabric carcass 1, which is formed in the usual manner by superimposing layers of treated cords or fabric, which are worked in the usual manner about bead portions 2. A relatively soft layer of rubber or rubber compound 3 is disposed upon the fabric carcass to extend from bead to bead. In the tread zone of the tire thus formed, various layers of breaker and cushion stock are applied to provide a staisfactory union between the tread 4 and the fabric carcass of the tire, as well as to insure the proper degree of strength in that zone of the tire.

Relatively thick side wall coverings 5, or pads, which are substantially of crescent shape in cross section, are applied one to each side wall of the tire. These pads 5 are preferably formed of a very tough and relatively hard rubber compound which will offer exceptional resistance against excessive wear by contact with rough surfaced roads. The pads 5 extend from each bead portion of the tire and beneath the tread member 4, as clearly shown in the drawing. The pads 5 may be applied separately to the tire and be of sufficient width to flow together, under the action of vulcanizing heat, beneath the tread of the tire, or a complete strip may be formed which tapers toward a relatively thin adjoining or intermediate portion 6 connecting the heavy side wall coverings.

The side wall coverings 5 are preferably of a harder rubber compound than either the compound contained in the tread member 4 or any of the other rubber composition of the tire. Although the side wall coverings are made relatively hard and tough, they are of sufficient flexibility that they do not detract from the resiliency of the tire as a whole. Furthermore, the amount of flexing that occurs in heavy pneumatic tires for commerical vehicles in ordinarily of a small amount since they give much better service if maintained in a tightly inflated condition.

Suitable soft rubber compound stock is interposed between the tread member 4 and the side wall coverings 5, as indicated at 7, to insure a good union between the tread member and the side wall coverings.

It will be appreciated, of course, that various layers of soft rubber compound and breaker strips may be interposed between the tread member of the tire and the portions of the side wall covering extending therebeneath, as well as between the side wall coverings and the fabric carcass of the tire and I do not wish to be restricted to any particular assembly of such material. My invention is mainly concerned with providing side walls for the tire of such construction as to resist excessive wear thereon and, consequently, protect the interior of the tire.

Although I have shown and specifically described a particular form of construction of pneumatic tires, it will be appreciated that minor changes may be made in the assembly of the material without departing from the spirit or scope of my invention and I desire, therefore, that no limitations shall be imposed except such as are indicated in the appended claims.

What I claim is:

1. A pneumatic tire comprising a carcass, a rubber tread member vulcanized thereto, and side wall pads of substantially crescent-shape in cross-section connected by a relatively thin integral portion tapering toward the central portion of the tread member, the side walls being formed of a rubber compound of greater hardness than the remaining composition of the tire.

2. A pneumatic tire comprising a carcass, a rubber tread member vulcanized thereto, and side wall pads of substantially crescent-shape in cross-section formed of a rubber compound of greater hardness than the remaining composition of the tire, the side wall pads being formed with a connecting portion tapering from each side wall pad toward the central portion of the tread member and being of greatest thickness immediately adjacent the edges of the tread member.

3. A pneumatic tire comprising a carcass, a rubber tread member vulcanized thereto, a relatively soft rubber covering upon the side walls of the carcass and relatively thick rubber pads of substantially crescent shape in cross section formed of a rubber compound of greater hardness than the remaining rubber composition of the tire vulcanized to the side walls thereof.

In witness whereof I have hereunto signed my name.

HAROLD A. BRITTAIN.